United States Patent [19]

Chase et al.

[11] 3,841,746

[45] Oct. 15, 1974

[54] CONTROL FOR SYNCHRONIZING PROJECTORS WITH AN AUDIO PROGRAM

[75] Inventors: Arthur B. Chase, San Francisco, Calif.; Paul C. Miller, South Euclid, Ohio

[73] Assignees: Arthur B. Chase, San Francisco, Calif.; Paul C. Miller, Euclid, Ohio ; part interest to each

[22] Filed: Feb. 26, 1973

[21] Appl. No.: 335,653

[52] U.S. Cl. .......... 353/15, 353/57, 353/85

[51] Int. Cl. .......... G03b 31/06, G03b 21/16

[58] Field of Search .......... 353/15–19; 179/100.2 S

[56] References Cited

UNITED STATES PATENTS

| | | | |
|---|---|---|---|
| 3,110,216 | 11/1963 | Chalfin | 353/15 |
| 3,305,645 | 2/1967 | Nisbet | 179/100.2 S |
| 3,480,738 | 11/1969 | Meyer | 353/15 |

FOREIGN PATENTS OR APPLICATIONS

| | | | |
|---|---|---|---|
| 620,465 | 5/1961 | Canada | 353/15 |

*Primary Examiner*—Louis R. Prince
*Assistant Examiner*—A. Jason Mirabito
*Attorney, Agent, or Firm*—Owen, Wickersham & Erickson

[57] ABSTRACT

A projector control system synchronizes the operation of the slide change mechanisms of three projectors with an audio program by means of projector slide change pulses recorded on one track of a stereo magnetic tape and an audio program recorded on another track of the tape. Three sine wave tones on the control tape cycle the projectors through frequency sensitive circuits and relays.

A fourth tone operates through an additional relay to turn the unit off at the end of the program.

A four tone oscillator bank or box enables the user to make up his own programed tapes.

12 Claims, 6 Drawing Figures

CONTROL FOR SYNCHRONIZING PROJECTORS WITH AN AUDIO PROGRAM

BACKGROUND OF THE INVENTION

This invention relates generally to a control system for automatically operating a projector in a pre-established sequence.

This invention relates particularly to a control system for actuating three slide projectors to change the slides in the projectors in a predetermined sequence and in coordination with an audio program recorded on a magnetic tape.

There are many situations in which it is desirable to operate a slide projector automatically and in synchronization with a recorded audio program. The coordination of a single projector with an audio program does not present too difficult a task. However, the complexities and difficulties increase rapidly with more than one projector.

Prior art attempts to achieve such automatic operation and control of multiple projectors in synchronization with a prerecorded audio program often resulted in a tangle of connecting lines, bulky control components and problems in operation because of malfunctions of the controls.

SUMMARY OF THE INVENTION

It is a primary object of the present invention to operate a plurality of projectors in synchronization with an audio program with a control system that requires only a single push of a start button to initiate a complete cycle of operation. The operation starts with turn-on of the recorder and projectors, continues through cycling of the projectors in any sequence desired by the programmer and ends with turning off of the projector blowers after the lamps have been allowed to cool for a sufficient period of time.

It is a closely related object to provide such a control system in an integrated unit which is quite compact in size and which is simple to construct and reliable in operation.

The control system constructed in accordance with the present invention incorporates a stereo tape playback recorder to control the slide projectors and to present the audio program through a loud speaker. The recorder plays a prerecorded tape which has one track prerecorded with signals to operate the three projectors. The other track is prerecorded with the audio program.

The programmer of the present invention is an integrated unit which contains all of the functions in a single setup. The playback unit can be any stereo tape recorder, such as, a cassette tape recorder, a continuous loop cassette or a recorder with a standard continuous loop cartridge. The recorder, playback relay unit and the projector (such as an Eastman Carousel projector) are all physically embodied in one single setup.

The system can operate a single projector or multiple projectors.

If a dissolve is wanted, the dissolve units can be placed beside the projectors.

The pulsing unit can be used with any tape recorder to prepare a control tape.

The relay box incorporates an automatic delayed time shut-off for protecting the lamps when the unit is shut off. When the off pulse calls for shutdown, only the lamps turn off along with the tape recorder. The projector fan motors continue to operate for about 5 minutes based on a transistorized holding circuit.

The shut-off pulse turns off the projector lamps by shorting across a coil in the holding circuit relay. The momentary short concept eliminates the need for continuous current through the off relay. This provides a very stable arrangement in that any shaking of the unit does not cause the loss of contact to shut off the operation too soon. In the present invention this loss of contact cannot happen because the relay contacts operate only when the off pulse is on the tape. A capacitor in the off circuit provides a time delay so that instantaneous, low frequency pulses will not accidentally shut down the system.

The relay box also incorporates protective circuits for preventing low voltage operation. If the initial line voltage is too low to switch a relay which holds the 120 volt line current flow to a main transformer winding of the relay box, the relay will not close and the unit will not turn on. Thus, if initial line voltage is too low to switch the relay, then it is too low to operate the unit, and the system provides another fail-safe device which is built in.

The system incorporates automatic start and stop relay logic together with filtering circuits and sensitive relays which are simple in construction and yet are effective in function to solve a quite complex design goal.

The frequencies are chosen to work with any good quality recorder and are not critical. Frequency changes due to oscillator problems or changes in tape speed are not likely to affect performance of the sensors of the playback box, and the only critical adjustment is the recording and playback VU level. Once set, this remains constant. Component values are not critical, and there are no construction layout problems as far as circuit design is concerned.

A playback relay unit and a control pulser unit incorporated in a system which has the structural features described above and which is effective to function in the manner described above constitute further specific objects of the present invention.

Other objects, advantages and features of my invention will become apparent from the following detailed description of the preferred embodiments taken with the accompanying drawings.

DESCRIPTION OF THE PREFERRED EMBODIMENTS

Figures 1, 2:
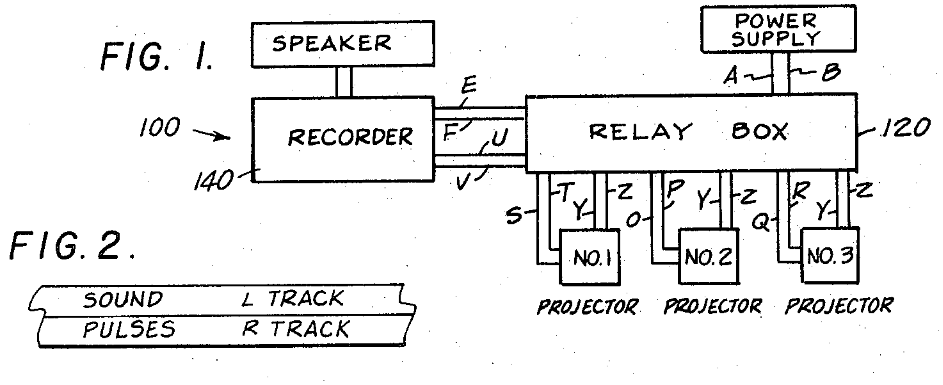
FIG. 1 is a block diagram of a control system constructed in accordance with one embodiment of the present invention and shows how a control relay unit is associated with a playback recorder to synchronize the slide change mechanism of three projectors with an audio program prececorded on a tape.
FIG. 2 is a fragmentary view of a section of tape and illustrates how the sound program is recorded on the L-track and the pulses for actuating the projectors are recorded on the R-track.

A playback system constructed in accordance with one embodiment of the present invention for coordinating the operation of one or more slide projectors with a prerecorded audio program is indicated generally by the reference numeral 100 in FIG. 1.

The system 100 includes a control relay unit or box 120 connected to a playback recorder 140 and one or more projectors such as the three projectors illustrated.

The playback recorder 140 plays a prerecorded tape which has an audio program recorded on one track (the L track as illustrated in FIG. 2) and pulses for controlling the operation of the projectors prerecorded on the other track (the R track as illustrated in FIG. 2).

Figure 3:
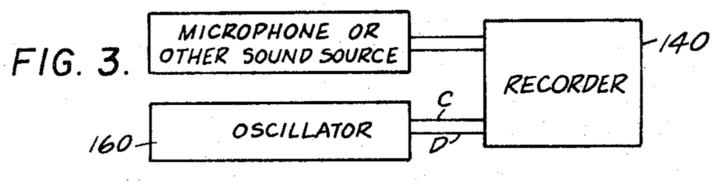
FIG. 3 is a block diagram showing how an oscillator constructed in accordance with an embodiment of the present invention is associated with a recorder to synchronize the control pulses for actuating the slide change mechanisms of a number of projectors with an audio program.

As illustrated in FIG. 3 an oscillator box 160 can be used with a recorder 140 and a microphone or other sound source to enable the user of the system 100 shown in FIG. 1 to make up his own program tapes.

In using the oscillator box 160 the user pushes an appropriate button on the oscillator box each time he wants to cycle a particular projector (on later playback). Any one projector, or any combination of the three projectors shown in FIG. 1, can be operated in this manner.

The oscillator box also has a fourth button, which produces a low frequency 80 Hz tone to activate an off-relay at the end of the program.

As illustrated in FIG. 3 the oscillator box 160 is plugged into a recorder 140. The connection is made to the microphone input of the recorder on the channel chosen to be the control channel. This is illustrated as the R channel in FIG. 2.

The programmer also plugs the microphone or other sound source into the remaining channel of the stereo recorder as illustrated in FIG. 3. This may be done on a master recorder for duplication, or may be made directly on a high fidelity cassette or cartridge tape recorder. The playback recorder 140 uses a cassette tape or a continuous loop cassette or a standard continuous loop cartridge for convenience in operation.

Figure 4:
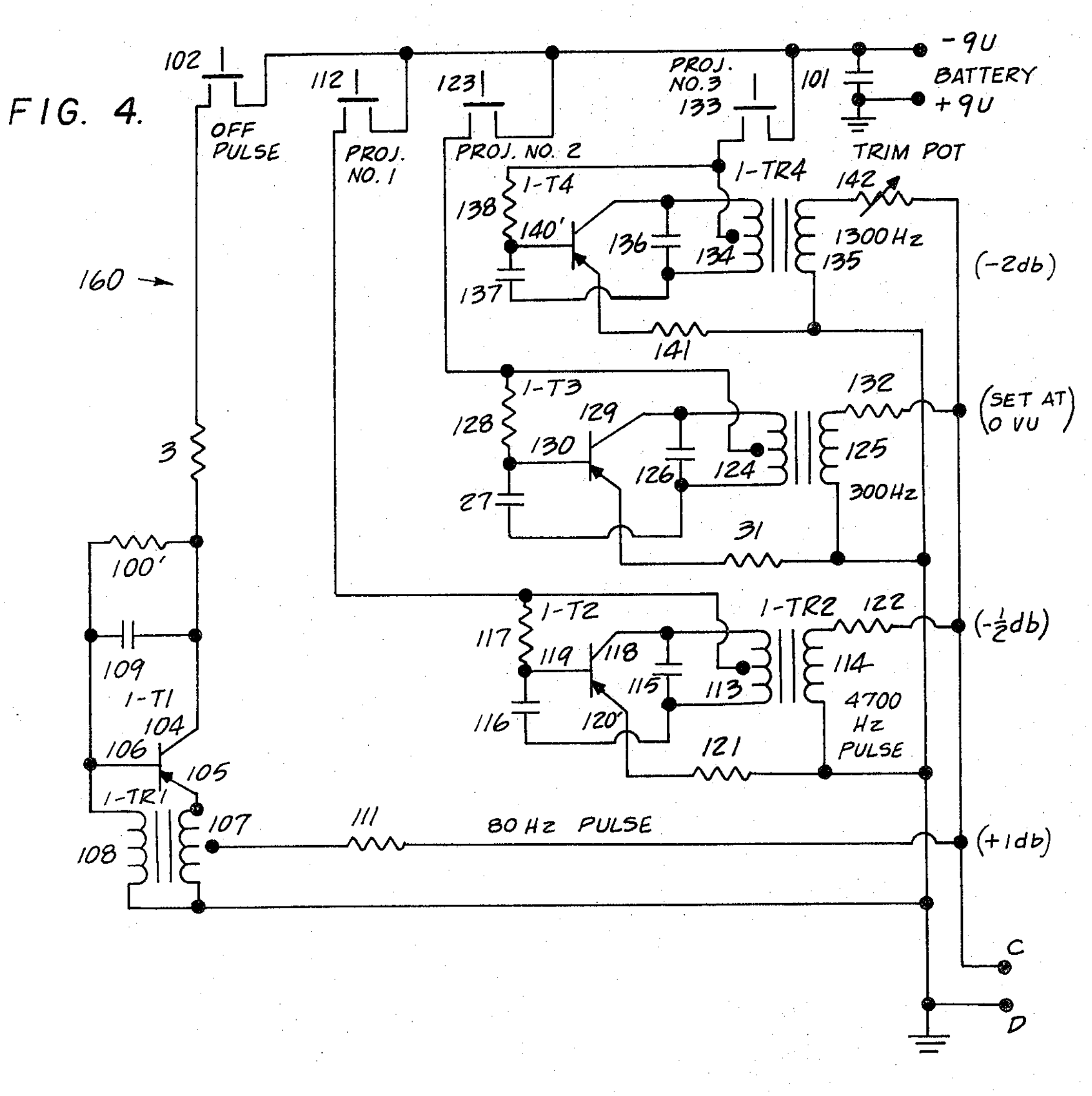
FIG. 4 is a schematic view of the components of the oscillator shown in FIG. 3.

After the oscillator box 160 and the microphone or other sound source have been plugged into the recorder 140 as illustrated in FIG. 3, the programmer starts the recorder 140 and makes his program, speaking into the microphone or playing his sound program from another source. At the same time the programmer pushes the oscillator buttons briefly to record the pulses to change the slides on the appropriate slide projectors, at the appropriate times, as will be described in greater detail below with reference to the schematic diagram of FIG. 4.

After the tape is made on the recorder shown in FIG. 3, the tape is placed in the recorder 140 built into the system 100 shown in FIG. 1.

The recorder used to make the program tape as described above with reference to FIG. 3 can be the same recorder that is used in the system 100 of FIG. 1, or an entirely separate recorder can be used to make the program tape.

As noted above the system 100 operates on a single push of the start button on the playback relay box 120. This single push of the start button initiates a complete cycle of operation to present a sound program on one channel of a stereo tape recorder and control signals on the second channel to cycle the three slide projectors in the programmed sequence.

When the programed tape has been placed in the recorder 140 of the system 100 shown in FIG. 1, the tape is ready to show a program.

The start button of the relay box 120 is depressed (as will be described in greater detail below with reference to the schematic diagram in FIG. 5). This sends a surge of line voltage into the system 100. Capacitors and relays inside the control unit or relay box 120 sense the presence of the line voltage from the power supply and initiate permanent turn-on of the projectors and the control unit itself.

Pulses on the tape then activate relays through electronic circuits tuned to the various oscillator frequencies in the oscillator box 160. The relays close and activate slide change mechanisms of the projectors as if the slide change buttons had been pushed manually by the projectionist.

If the power should fail temporarily, the unit shuts off and must be restarted manually. This safeguard prevents the slides from jamming. The system 100 restarts after a pause with no difficulty.

The off pulse at the end of the tape activates the off relay and turns off the projector lamps and the tape recorder. A short while later (5 minutes later in a particular embodiment of the present invention) the time delay holding circuit releases; and the entire system 100 shuts off. This also cuts power to the projectors and turns off their fans.

Referring to the first drawing figure, we will explain the operation of the oscillator box.

Current from a small 9-volt transistor-radio battery charges a capacitor 101, which reduces interference from one oscillator to another during simultaneous operation with a weak battery.

To test the system, record an off pulse by pushing the push-button switch 102 to feed voltage to the 80-Hz oscillator through the dropping resistor 103. A negative pulse enters the transistor 1–T1 collector 104, moves through the emitter 105 and on through the winding 107 of an audio transformer 1–TR1, continuing on to ground or positive potential. This electron flow sets up a current in the winding 108 to feed a pulse to the base 106 of 1–T1 and a resonance capacitor 109. Resonance between the capacitor 109 and the transformer 1–TR1 continues the oscillation. A resistor 110 bleeds off the charge on the capacitor 109 to ensure start of oscillation with each push of the button 102. The 80 Hz (approx.) signal feeds through resistor 111 to the common bus and out of the unit through the lines C and D to the tape recorder 140 microphone input.

The test signal should move the VU meter in the tape recorder to mid point approximately.

Next, turn on the tape transport and record the slide-change pulses.

To record a pulse for the projector No. 1, depress the push-button switch 112 to send a negative voltage to the transformer 1–TR2, the winding 113, and on to the transistor 1–T2, collector 118 and emitter 120, out through the dropping resistor 121 and ground. A resonance circuit consisting of the winding 113 and the capacitors 115 and 116 creates an oscillation of about 4,700 Hz, fed to the common bus from the winding 114 and the isolation resistor 122. The resistor 117 biases the base 119 of the transistor 1–T2.

To record a pulse for the projector No. 2, depress the push-button switch 123, sending voltage to the circuit involving the components 124 through 132. The capacitors 126 and 127 are chosen to sustain oscillation at approximately 300 Hz, fed to the common audio bus through the resistor 132. Set this tone at −10 VU on the record meter of the tape recorder; and, on playback, set it at plus one on the test VU meter, or set the playback-volume to the point where the projector No. 2 relay just trips.

To record a pulse for the projector No. 3, depress the push-button switch 133 to activate the components 134 through 142. The capacitors 136 and 137 are chosen to resonate with the transistor 1–T4 and the transformer 1–TR4 to produce a tone of about 1,300 Hz. The variable resistor 142 balances this tone with the other three and helps trim the system for approximately equal recording level for all tones. Tones should record within plus or minus 3db, and any combination of one, two, or all three trip tones may be used at one time.

The off tone must be used separately.

This, then, is the operation of the oscillator box 160. The operation is based largely on basic oscillator principles. However, the 80-Hz oscillator is believed to be unique, based on its emitter-output feedback to the base through the transformer 1–TR1. The design is based on simplicity to use the fewest parts and to give a stable output. The unique pulse shape is an interesting broken sawtooth or spike pattern.

The windings 114, 125, and 135 are 8 ohms, loading into the resistors 122, 132, and 142 which range from 27,000 ohms to 50,000 ohms, thus providing good isolation. Likewise, the resistor 111 is 120,000 ohms, isolating the 2,000 ohm winding 107 from any loading that would affect operation of the off oscillator.

Figures 5, 6:
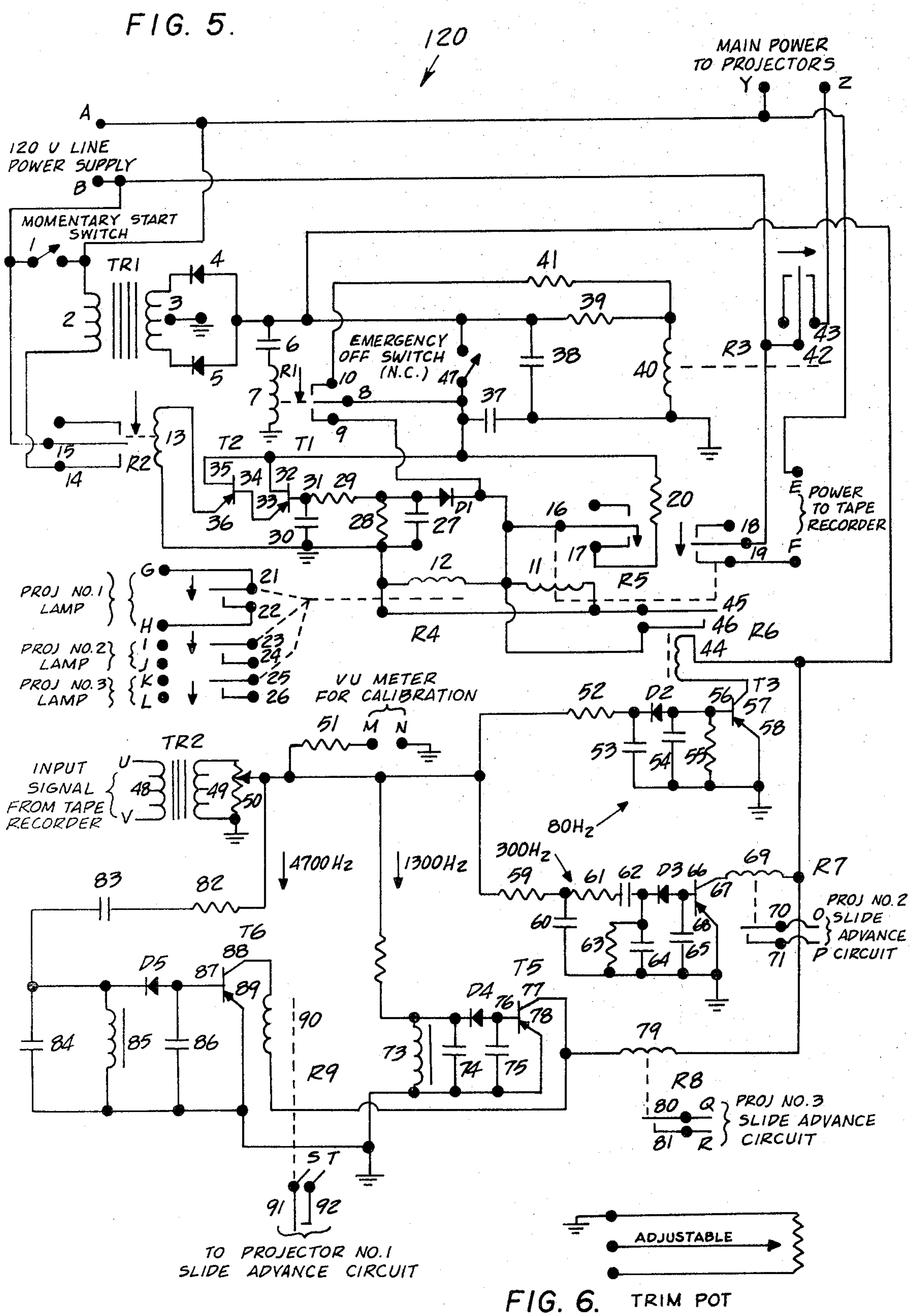
FIG. 5 is a schematic view showing the components of the relay box shown in FIG. 1.
FIG. 6 is a schematic view of a trim pot which can be substituted for the volume control on one track of a stereo tape recorder to help match the playback recorder to the tones recorded on the tape by the oscillator.

Referring now to FIG. 5 which shows details of the relay box 120, when the operator pushes the start switch 1, power from the 120-volt ac line supply A and B activates the power transformer TR1 through the primary winding 2. The 12.3 volt secondary winding 3 supplies the rectifier diodes 4 and 5 with ac voltage for conversion to dc in the conventional manner. The dc current charges the capacitor 6 and in so doing passes a momentary current flow through the coil 7 of the relay R1, closing the contacts 8 and 9 to activate the holding circuits.

In the holding circuits, current from the relay terminal 9 goes to the coil 11 of the relay R5, the coil 12 of the relay R4, the diode D1, and the terminal 16 of the relay R5.

The relay R5 closes the contacts 16 and 17 to feed power from the power supply directly to the coils 11 and 12 through the dropping resistor 20. This holds the relay R5 closed, even when the momentary-contact relay R1 returns to normal after the capacitor 6 is charged, breaking the connection between the contacts 8 and 9. Simultaneously, the relay R4 closes the lines G and H through the relay contact 21 and 22, the lines I and J through the contacts 23 and 24, and the lines K and L through the contacts 25 and 26.

The lines G and H turn on the lamps in the projector No. 1.

The lines I and J control the projector No. 2 lamp.

The lines K and L control the projector No. 3 lamp.

These 5 amp lines and relay contacts are independent of all other connections in the relay box. Each pair hooks in series with the projector lamp and the 120-volt line.

During the instant of turn-on, current flows through the diode D1, charging the capacitor 27 and feeding through the resistor 29 to the base 31 of the transistor T1.

The capacitor 30 prevents oscillation and filters out radio-frequency that would interfere with proper operation of the transistors T1 and T2.

Direct current from the power supply feeds the collectors 32 and 35 of the transistors T1 and T2, and voltage at the base 31 turns on transistor T1, feeding negative voltage through the emitter 33 to 34, the base of the transistor T2. This in turn feeds current flow from the collector of the transistor T2 to the emitter 36 to the coil 13 of the relay R2.

The relay R2 closes the contacts 14 and 15 to hold 120 volt line current flow to the winding 2 of the transformer TR1. This is necessary, because the start switch 1 is a momentary-contact switch.

The transistors T1 and T2 work with the components D1, 27, 28, 29 and 30 to form a delay circuit for turn off, explained later.

The dc power from the diodes 4 and 5 also charges the capacitor 38, the main filter capacitor, and also the capacitor 37, an auxiliary filter capacitor that prevents damage to the transistors T1 and T2 from voltage spikes created when the emergency off switch 47 is depressed.

The switch 47 is normally closed. When pushed, it interrupts all dc to all holding circuits, so the unit shuts off.

When the momentary relay R1 returns to its normal resting state, the contacts 8 and 10 are closed, sending dc power through the resistor 41 to the coil 40 of the relay R3. This closes relay R3, and the contacts 42 and 43 connect the main ac line power to the projectors and the tape recorder through the lines C and D and E and F, respectively.

The purpose of the resistor 39 is to hold the relay R3 closed even if the contacts 8 and 10 of the relay R1 should open, as might be caused by vibration of the unit. The relay R1 is a sensitive design subject to momentary contact interruptions if the playback relay box is jarred. The value of the resistor 39 is high enough to prevent the relay R3 from closing until the resistor 41 is connected to the contact 8. This delays turn-on of the projector and tape recorder until the holding circuits are set, and this prevents a sudden momentary voltage drop from hindering operation of the holding relay R2. If the projector lamps come on and draw 15 amps or more from a long line, the voltage will drop momentarily while the bulbs heat up. But if the voltage remains low, because of poor wiring in the ac power supply to the system, the relay R2 will not remain closed and the unit will not operate.

This is a fail-safe feature to prevent overheating long extension cords, which should not be used.

The resistor 39 also helps reduce voltage spikes caused by kickback from the coil 40 of the relay R3 when the off switch 47 is pushed.

The resistor 20 works in conjunction with the relay R6 and the coil 44 and the contacts 45 and 46 to activate the off function, described later.

Once the unit has been turned on, voltages are stabilized, and holding and delay relays are set, the unit is operational. The tape recorder is running, and dc power flows to the frequency-sensitive relay circuits described next.

All signals from the tape recorder enter the playback box through the 8 ohm winding 48 of the audio transformer TR2.

The secondary winding 49 feeds signal to the level-set potentiometer 50 and on to the filter circuits consisting of four legs.

The signal going through the resistor 51 and the terminals M and N feeds a standard 500 ohm VU meter for use in calibration of playback tape.

The projector 2 tone is used to set the level at plus 1 VU. This tone is the master for setting levels as will be described in more detail below.

To explain the operation of the filter circuits, first consider the off pulse. This low-frequency tone of 80 Hz from the tape recording is sensed by the network feeding transistor T3. Signals from this transformer feed through the isolation resistor 52 and the rectifying diode D2. The filter capacitor 53 weakens all signals except the low-frequency tone, shorting higher frequencies to ground. The capacitor 54 stores energy until the voltage rises high enough to cause the transistor T3 to conduct, activating the coil 44 of the relay R6. The resistor 55 drains the charge off of the capacitor 54 so that leakage of other tones through the simple filter will not turn the unit off prematurely. The contacts 45 and 46 of the relay R6 close and short across the relay coils 11 and 12 of the relays R4 and R5 causing them to open. This turns off the projector lamps, the tape recorder, and holding-circuit relay R5; and it cuts off dc voltage to diode D1. The diode stops current from flowing back into the relay coils 11 and 12 from the capacitor 27, so that this capacitor drains its charge slowly through the resistor 29 to the base 31 of the transistor T1. Thus the transistors T1 and T2 conduct and transmit current to the coil 13 of the relay R2 until the capacitor 27 discharges to the cutoff-voltage of the transistor T1. This delay time keeps the line voltage on to operate the power supply and the main relay R3 so that projector fans have time to cool the projector lamps before the unit shuts off entirely. The purpose of the resistor 20 is to prevent the short-circuit action of the relay R6 from destroying the power supply or its own contacts 45 and 46. Normally, these contacts would be in a series arrangement in a conventional holding circuit, but here we eliminate the need for the contacts to remain closed during the running time. They serve only during the instant of turn-off, thus eliminating a possible cause of malfunction mid-program.

The 300 Hz signal pulse for the projector No. 2 is sensed by the circuits involving the transistor T4 and the relay R7. Signals from the transformer TR2 feed through the isolation resistor 59 to the simple resistance-capacitance filter network. The capacitor 60 partially shorts higher frequencies to ground, and transmits low frequencies unhindered to the level-balancing resistor 61 and the series capacitor 62. The capacitor 62 and the resistor 63 weaken the low frequency of 80 Hz so that only the 300 Hz signal passes to the diode D3 to be rectified and then stored by the capacitor 65. The capacitor 64 provides additional filtering of unwanted higher frequencies at this point. When the base voltage is sufficient at the base 66, dc current flows through the emitter 68, the collector 67, and the coil 69 of the relay R7. When this relay closes the contacts 70 and 71, the lines O and P to the projector No. 2 are short-circuited, causing this projector's slide-change mechanism to cycle just as if the operator had pushed the button on the remote-control cord connected to the projector.

For activating slide change in the projector No. 3, a 1,300 Hz signal flows through the isolation resistor 72 to the transistor T5 filter network. The coil 73 is a 100 mH inductor that resonates with the capacitor 74 at the design frequency of 1,300 Hz. This resonance allows only that signal to pass through the rectifier diode D4, charging the capacitor 75 in the manner explained before. The transistor T5 conducts, allowing dc current to flow through the coil 79 of the relay R8, which closes to actuate the projector No. 3 through relay terminals 80 and 81 and the lines Q and R.

Finally, the 4,700 Hz signal actuates the projector No. 1 through the T6 resonance circuit. The 4,700 Hz signal passes through the isolation resistor 82 and the filter capacitor 83. The capacitor 83 weakens most signals below the 4,700 Hz frequency. The resonance circuit, consisting of the capacitor 84 and the inductor 85, is tuned to 4,700 Hz. It thus passes any signal of this frequency to the diode D5 for rectification and voltage build-up across the capacitor 86 to raise the base voltage at 87 to cause the transistor T6 to conduct. The coil 90 of the relay R9 then closes the contacts 91 and 92 to cycle the projector, connected to the lines S and T.

In all of the frequency-sensitive relay circuits of the invention, the relays open quickly after the pulse signals stop, bcause the capacitors 54, 65, 75, and 86 discharge quickly when the associated transistors begin to conduct.

The off pulse is applied at the end of the taped program. For another showing, the operator must reset the slides, push the start button, rewind the tape, push the off button, set the tape recorder in the play mode, and push the on button when he is ready to start the program. The showing is then automatic all the way to shutoff. Also, a continuous loop cassette tape can run the unit indefinitely, using the repeating rotary trays of the projectors.

Thus, the three sine wave tones on the control tape cycle the projectors through the frequency sensitive circuits and the relays R7, R8 and R9.

A fourth tone through the relay R6 turns the unit off at the end of the program. The shut-off pulse turns off the projector lamps by shorting across the 12 volt coil 11 of the relay R5, the holding circuit relay. The 18 ohm dropping resistor 20 in series with this relay and the power supply prevent damage to the power supply. The momentary short concept eliminates the need for continuous current through the off relay. This is important because the sensitive relay used is mechanically unstable in the de-energized condition. In the conventional series arrangement, any shaking of the unit would cause the contact to lose contact and to shut off the operation too soon. This can't happen since the relay contacts 45 and 46 of relay R6 operate only when the off pulse is on the tape.

The 200 ufd capacitor 54 in the transistor T3 off circuit provides a time delay so that instantaneous, low frequency pulses will not accidentally shut down the system.

When the off pulse calls for shutdown, only the lamps turn off along with the tape recorder (relays R4 and R5). The projector fan motors continue to operate for about 5 minutes, based on the transistorized holding circuit using the diode D1 and the transistors T1 and T2. This holds the relay R2 closed until the 100 ufd capacitor 27 is drained. When the relay R2 then opens, all power to the relay box 160 is shut off and all the relays come to the de-energized position. There is no more action until someone pushes the start button again. Also, if for any reason there is a power interruption, or if the stop button is pushed, all circuits shut off and the system must be restarted. The system can be restarted without any confusion to the program if the program is stopped at any instant when there is no slide change pulse on the tape.

If the set level for projector No. 2 is accidentally set too high, this, too, will operate the off switch as a signal to restart after checking the playback level for the correct setting. If allowed to operate with the set level too high, the synchronization would be incorrect and the projectors would not change slides in the proper sequence.

To eliminate the need for line voltage and dc relay voltage sharing the same start switch, we employ the relay R1 to provide momentary connection of the 12 volt dc supply to the holding relay terminals at the instant the momentary start switch connects 110 volts to the power transformer TR1. From then on, the contacts on the relay R2 hold the line voltage on, and the contacts on the relay R5 connect the holding circuit. The holding circuit is released when the off pulse is sensed, and the delay circuit holds the line voltage on for the additional five minutes by way of the relay R2.

The momentary action of the relay R1 derives from the charging of the 200 ufd capacitor 6 connected to it. After it is charged, there is no more current to the R1 coil 7 and the contact between 8 and 10 returns to activate the relay R3, the projector fan relay. This one second delay allows all relays to lock in place before the full load of the projector drops the line voltage. This is important, because if the voltage is too low, the relay R2 will not close and the unit will not turn on. After the relay R2 is closed, hwever, low voltage will not cause it to drop out. If the initial line voltage is too low to switch the relay R2, then it is too low to operate the unit; and so we have another fail-safe device built in.

The 100 ohm resistor 39 between the power supply and the coil 40 of the relay R3 holds the relay on if the contacts of the relay R1 are jarred during operation. As noted, the sensitive relay in the "resting" or de-energized position is sensitive to vibration and can lose contact for brief instants. The 100 ohm resistor 39 holds the relay R3 fully latched during these instants. The 200 ufd capacitor 37 connected to the off switch prevents any high voltage kickback from the relay coils from destroying the transistor T1.

The projector No. 2 tone is the master for setting levels. This 300 Hz tone is set for plus 1 DB (in the red) on the VU meter playback.

Everything else falls into place with fairly wide allowable tolerance on the projector No. 1 and projector No. 3 tolerance.

The trim pot 142 can be turned to adjust the level of the projector No. 3 on playback. It should be set about 1 or 2 VU below the projector No. 2 tone for optimum results.

The projector No. 1 tone should be about the same.

In some cases it may be desirable to add a trim pot like that shown in FIG. 6 to the playback recorder to match up tones with a particular playback recorder being used. The trim pot shown in FIG. 6 can be mounted on the outside of the case of a recorder and connected to the leads for the volume control rheostat on the R track of the recorder as a substitute for the rheostat volume control built into that track of the recorder. The resistor for the trim pot shown in FIG. 6 is selected to provide the desired match up, and in the case of a particular cassette recorder model made for Radio Shack, a 25K ohm resistor is used. The trim pot is then adjusted with a screw driver to adjust for the three projector signals and the stop signal. Once the trim pot is initially adjusted, it is left at that adjustment thereafter. No further adjustment is needed. Since the volume control for the R track is thus effectively disconnected, changes in the volume setting of the L track does not affect the R track signals.

The present invention provides a number of novel and highly useful results.

The present invention provides an integrated system which contains all of the functions described above in a single setup. The system is easy to set up and to operate. The system provides an automatic delayed time shutoff for protecting the lamps.

The system also provides protective circuits to prevent low voltage operation.

The automatic start and stop relay logic described above is a highly useful feature of the invention and greatly simplifies operation.

The filtering circuits and the sensitive relays associated with the filtering circuits provide a direct, concise solution in view of the complexity of the design goal.

The frequencies are chosen to work with any good quality recorder, and the frequencies are not critical.

Frequency changes due to oscillator problems or changes in tape speed are not likely to affect performance of the sensors in the playback box, and the only critical adjustment is the recording and playback VU level. Once set, this remains constant.

Component values are not critical, and there are no construction layout problems as far as circuit design is concerned.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A control unit for controlling a plurality of slide projectors, each having a lamp, a blower and a slide change mechanism, in response to slide change pulses and an off pulse recorded on a magnetic tape and wherein the control unit is constructed to be connected to the projectors and to the output of a playback recorder which plays the tape, said control unit comprising, frequency sensing means for sensing each slide change pulse and the off pulse, a plurality of slide change relay means, each operatively associated with the frequency sensing means for actuating the slide change mechanism of a particular projector in response to the sensing of a slide change pulse having a frequency corresponding to that projector, lamp relay means operatively associated with the frequency sensing means for shutting off all of the projector lamps immediately on the sensing of the off pulse, blower relay means operatively associated with the frequency sensing means for shutting off all of the blowers on the sensing of the off pulse, time delay means for delaying the actuation of the blower relay means for a fixed period of time after the sensing of the shutoff pulse to permit the blowers to cool the projector lamps, and a line voltage relay means operatively associated with the blower relay means and wherein the time delay means includes a holding circuit which holds the line voltage relay closed for said fixed period of time.

2. The invention claimed in 1 wherein the holding circuit includes a capacitor and the size of the capacitor determines the duration of said fixed period of time.

3. A control unit for controlling a plurality of slide projectors, each having a lamp, a blower and a slide change mechanism, in response to slide change pulses and an off pulse recorded on a magnetic tape and wherein the control unit is constructed to be connected to the projectors and to the output of a playback recorder which plays the tape, said control unit comprising, frequency sensing means for sensing each slide change pulse and the off pulse, a plurality of slide change relay means, each operatively associated with the frequency sensing means for actuating the slide change mechanism of a particular projector in response to the sensing of a slide change pulse having a frequency corresponding to that projector, lamp relay means operatively associated with the frequency sensing means for shutting off all of the projector lamps immediately on the sensing of the off pulse, blower relay means operatively associated with the frequency sensing means for shutting off all of the blowers on the sensing of the off pulse, and a line voltage relay means operatively associated with all of said other relays to shut down all circuits in said control unit in the event of a power failure.

4. A control unit for controlling a plurality of slide projectors, each having a lamp, a blower and a slide change mechanism, in response to slide change pulses and an off pulse recorded on a magnetic tape and wherein the control unit is constructed to be connected to the projectors and to the output of a playback recorder which plays the tape, said control unit comprising, frequency sensing means for sensing each slide change pulse and the off pulse, a plurality of slide change relay means, each operatively associated with the frequency sensing means for actuating the slide change mechanism of a particular projector in response to the sensing of a slide change pulse having a frequency corresponding to that projector, lamp relay means operatively associated with the frequency sensing means for shutting off all of the projector lamps immediately on the sensing of the off pulse, blower relay means operatively associated with the frequency sensing means for shutting off all of the blowers on the sensing of the off pulse, and off pulse relay means operatively associated with the lamp relay means and the blower relay means for shutting off the lamp and blower on the sensing of the off pulse and wherein the frequency for the slide change pulse of one particular projector is a master pulse frequency and the frequency sensing means for that frequency are operatively associated with off pulse relay to trigger the off pulse relay in the event the volume level of the master pulse frequency is too high.

5. A control unit for controlling a plurality of slide projectors, each having a lamp, a blower and a slide change mechanism, in response to slide change pulses and an off pulse recorded on a magnetic tape and wherein the control unit is constructed to be connected to the projectors and to the output of a playback recorder which plays the tape, said control unit comprising, frequency sensing means for sensing each slide change pulse and the off pulse, a plurality of slide change relay means, each operatively associated with the frequency sensing means for actuating the slide change mechanism of a particular projector in response to the sensing of a slide change pulse having a frequency corresponding to that projector, lamp relay means operatively associated with the frequency sensing means for shutting off all of the projector lamps immediately on the sensing of the off pulse, blower relay means operatively associated with the frequency sensing means for shutting off all of the blowers on the sensing of the off pulse, and a start switch which is momentarily depressed to turn on the control unit by connecting the control unit to a power supply, a line holding relay means for holding the line voltage on, a holding circuit relay means for the line holding relay means and a momentary relay means effective to provide momentary connection of voltage to the terminals of the holding relay means on depression of the start switch to eliminate the need for line voltage and dc relay voltage to share the same start switch.

6. The invention defined in claim 5 including a capacitor connected to the momentary relay means for supplying current to the coil of the momentary relay means only until the capacitor is charged and for diverting current from the blower relay means until the capacitor is charged to provide a time delay which allows all relays to lock in place before the full load of the projectors drops the line voltage.

7. The invention defined in claim 6 wherein the line holding relay means close only if the initial line voltage is sufficiently high to switch the line holding relay means during the time delay provided by said capacitor so that said control unit will not start operation with too low line voltage.

8. The invention defined in claim 5 including a resistor between the power supply and the blower relay means in series with the power supply and the coil of the blower relay means and sufficiently large to hold the blower relay means on if the contacts of the momentary relay means are jarred during operation so that the blower relay means are held fully latched during such instants.

9. A control unit for controlling a plurality of slide projectors, each having a lamp, a blower and a slide change mechanism, in response to slide change pulses and an off pulse recorded on a magnetic tape and wherein the control unit is constructed to be connected to the projectors and to the output of a playback recorder which plays the tape, said control unit comprising, frequency sensing means for sensing each slide change pulse and the off pulse, a plurality of slide change relay means, each operatively associated with the frequency sensing means for actuating the slide change mechanism of a particular projector in response to the sensing of a slide change pulse having a frequency corresponding to that projector, lamp relay means operatively associated with the frequency sensing means for shutting off all of the projector lamps immediately on the sensing of the off pulse, blower relay means operatively associated with the frequency sensing means for shutting off all of the blowers on the sensing of the off pulse, time delay means for delaying the actuation of the blower relay means for a fixed period of time after the sensing of the shutoff pulse to permit the blowers to cool the projector lamps, and a line voltage relay means, a holding relay means operatively associated with the line voltage relay means for holding voltage to the line voltage relay means, off pulse relay means actuated on sensing of the off pulse and wherein the off pulse relay means are operatively associated with the holding relay means to actuate the lamp relay means to shut off the lamps by shorting across the coil of the holding relay means whereby the off pulse relay means need be only momentarily actuated and need not be continuously supplied with current.

10. The invention defined in claim 9 including a resistor in series with the holding relay means for preventing damage to the power supply during shorting across the coil of the holding relay means.

11. The invention defined in claim 9 wherein the off pulse relay contacts are normally open and close only when the off pulse is sensed so that any shaking of the control unit cannot cause the contacts of the off pulse relay means to lose contact and to shut off the operation too soon.

12. The invention defined in claim 11 including a capacitor in the off pulse relay means to prevent instantaneous, low frequency pulses lower than the frequency of the off pulse from accidentally shutting down the system.

* * * * *